United States Patent
Eriksson et al.

(10) Patent No.: US 8,508,233 B2
(45) Date of Patent: Aug. 13, 2013

(54) ARC DETECTOR AND ASSOCIATED METHOD FOR DETECTING UNDESIRED ARCS

(75) Inventors: Thomas Eriksson, Bälinge (SE); Stefan Halen, Västerås (SE); Jonas Hedberg, Västerås (SE)

(73) Assignee: ABB Research Ltd. (CH)

( * ) Notice: Subject to any disclaimer, the term of this patent is extended or adjusted under 35 U.S.C. 154(b) by 268 days.

(21) Appl. No.: 12/909,674

(22) Filed: Oct. 21, 2010

(65) Prior Publication Data

US 2011/0057662 A1    Mar. 10, 2011

Related U.S. Application Data

(63) Continuation of application No. PCT/EP2009/054727, filed on Apr. 21, 2009.

(30) Foreign Application Priority Data

Apr. 21, 2008 (EP) .................................... 08154872
Apr. 21, 2008 (EP) .................................... 08154884

(51) Int. Cl.
*G01R 31/08* (2006.01)
*G08B 21/00* (2006.01)

(52) U.S. Cl.
USPC .......................................... 324/536; 340/635

(58) Field of Classification Search
USPC .. 324/416–424, 536, 541–547; 340/635–656
See application file for complete search history.

(56) References Cited

U.S. PATENT DOCUMENTS

| | | | | |
|---|---|---|---|---|
| 5,373,241 A | * | 12/1994 | Ham, Jr. et al. | 324/536 |
| 5,447,150 A | * | 9/1995 | Bacon | 128/200.14 |
| 5,831,538 A | * | 11/1998 | Schena | 340/635 |
| 6,448,758 B1 | * | 9/2002 | Krahn et al. | 324/754.1 |
| 7,053,625 B2 | * | 5/2006 | Dominelli et al. | 324/455 |
| 8,234,085 B2 | * | 7/2012 | Montanari et al. | 702/58 |

(Continued)

FOREIGN PATENT DOCUMENTS

DE    19523270 C1    9/1996

OTHER PUBLICATIONS

European Search Report; Application No. EP 08 15 4884; Aug. 29, 2008; 5 pages.

(Continued)

*Primary Examiner* — Joshua Benitez-Rosario
(74) *Attorney, Agent, or Firm* — St. Onge Steward Johnston & Reens LLC

(57) ABSTRACT

An arc detector for detecting undesired arcs. The arc detector includes: an antenna for receiving an electromagnetic signal representing an arc; and a discriminator for analyzing a signal from the antenna, the discriminator including a spectrum analyzer arranged to detect whether the signal represents a normal arc or an undesired arc. The discriminator is arranged to detect whether the signal represents a normal arc or an undesired arc by comparing signal levels at frequencies of a spectrum of the signal corresponding to at least one partial reference spectrum, and determining the arc to be a normal arc if a deviation from the reference spectrum is less than a threshold deviation. A corresponding method is also presented.

8 Claims, 3 Drawing Sheets

(56) References Cited

U.S. PATENT DOCUMENTS

| | | | |
|---|---|---|---|
| 8,264,237 B2 * | 9/2012 | Coumou | 324/536 |
| 8,289,029 B2 * | 10/2012 | Coumou | 324/536 |
| 8,334,700 B2 * | 12/2012 | Coumou et al. | 324/536 |
| 2005/0104616 A1 * | 5/2005 | Cullen et al. | 324/772 |
| 2008/0288189 A1 * | 11/2008 | Rao et al. | 702/59 |

OTHER PUBLICATIONS

International Search Report and Written Opinion of the International Searching Authority; PCT/EP2009/054727; Sep. 11, 2009; 9 pages.

European Search Report; Application No. EP 08 15 4872; Aug. 29, 2008; 5 pages.

* cited by examiner

ARC DETECTOR AND ASSOCIATED METHOD FOR DETECTING UNDESIRED ARCS

CROSS-REFERENCE TO RELATED APPLICATIONS

The present application is a continuation of pending International patent application PCT/EP2009/054727 filed on Apr. 21, 2009, which designates the United States and claims priority from European Patent Application Nos. 08154884.4 filed on Apr. 21, 2008, and 08154872.9 filed on Apr. 21, 2008. The content of all prior applications is incorporated herein by reference.

FIELD OF THE INVENTION

The present invention relates generally to detecting arcs, and more particularly to discriminating between normal and undesired arcs.

BACKGROUND OF THE INVENTION

In many electrical fields, arcing, i.e. electrical discharging, can occur. Some arcing can be a normal part of the operation, while some arcing is undesired and can even be dangerous.

As a first example, in power transformers, on-load tap changers (OLTC) are used to change tapping connections of transformer windings while the transformer is energized. Some arcing will occur, and it is desired to keep such arcing inside vacuum containers, rather than e.g. arcing in transformer oil. Arcing in oil can create wear on contacts and reduces the quality of the oil. It is therefore desired to be able to discriminate between normal arcing inside the vacuum container and undesired arcing outside the vacuum container. Avoiding arcing in oil allows the use of less expensive material in the contacts and increases the time between oil changes, thus allowing for longer maintenance intervals.

As a second example, in electrical motors, both normal and undesired arcing may occur, and it is desirable to discriminate between these two.

Consequently, there is a need to detect and discriminate between normal arcs and undesired arcs.

SUMMARY OF THE INVENTION

An object of the present invention is to provide an arc detector and method for detecting and discriminating between normal arcs and undesired arcs.

According to the invention there is provided an arc detector for detecting undesired arcs. The arc detector comprises: an antenna for receiving an electromagnetic signal representing an arc; and a discriminator for analyzing a signal from the antenna, the discriminator comprising a spectrum analyzer arranged to detect whether the signal represents a normal arc or an undesired arc. The discriminator is arranged to detect whether the signal represents a normal arc or an undesired arc by comparing signal levels at frequencies of a spectrum of the signal corresponding to at least one partial reference spectrum, and determining the arc to be a normal arc if a deviation from the reference spectrum is less than a threshold deviation.

The spectrum analysis allows for a way to discriminate between normal and undesired arcs using only the signal from the antenna. Furthermore, using spectrum analysis, the discrimination is independent of time, allowing the detection of an undesired arc at any point. By using a threshold deviation, small natural deviations from an ideal signal are still interpreted correctly. The threshold can be adjusted as necessary. By only comparing signal levels at frequencies corresponding to the one or more partial reference spectrums, a more reliable and robust determination is achieved, particularly when the frequency bands for the partial reference spectrums are selected where the difference between a normal and undesired arc has found to be relatively large.

The arc may be related to the operation of an electrical apparatus. In other words, any electrical device where normal and undesired arcs exist would benefit from the present invention, e.g. electrical machines such as transformers, electrical motors, circuit breakers, etc.

The arc may be related to the operation of an on-load tap changer of a power transformer, and the normal arc may be an arc inside a vacuum container of the on-load tap changer and the undesired arc may be an arc outside the vacuum container. In on-load tap changers of power transformers, there are both normal arcs and undesired arcs, whereby the present invention is used with advantage.

The arc detector may further comprise a band-pass filter arranged to receive an input signal from the antenna and to provide an output signal to the discriminator.

The arc detector may further comprise: a mixer arranged to receive an input signal from the band-pass filter, the mixer further being connected to receive an input signal from an oscillator, and a low-pass filter, arranged to receive an input signal from the mixer and provide an output signal to the discriminator.

This allows further processing to be performed at lower frequencies.

The arc detector may further comprise: an envelope detector arranged to receive an input signal from the low-pass filter and to provide an output signal to the discriminator.

A second aspect of the present invention is a method for detecting undesired arcs. The method comprises the steps of: receiving an electromagnetic signal representing an arc using an antenna and providing the signal to a discriminator; and discriminating, in the discriminator, between a normal arc and an undesired arc using the signal from the antenna. The discriminating comprises using a spectrum analyzer for discriminating between a normal arc and an undesired arc, and comparing signal levels at frequencies of a spectrum of the signal corresponding to at least one partial reference spectrum, determining the arc to be a normal arc if a deviation from the reference spectrum is less than a threshold deviation.

The discriminating may discriminate between a normal arc inside a vacuum container of an on-line tap changer for a power transformer, and an undesired arc outside the vacuum container.

In the determining, the deviation may be determined using a root mean square calculation.

It is to be noted that any feature of the first aspect may be applied to the second aspect, and vice versa.

Generally, all terms used in the claims are to be interpreted according to their ordinary meaning in the technical field, unless explicitly defined otherwise herein. All references to "a/an/the element, device, component, means, step, etc." are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
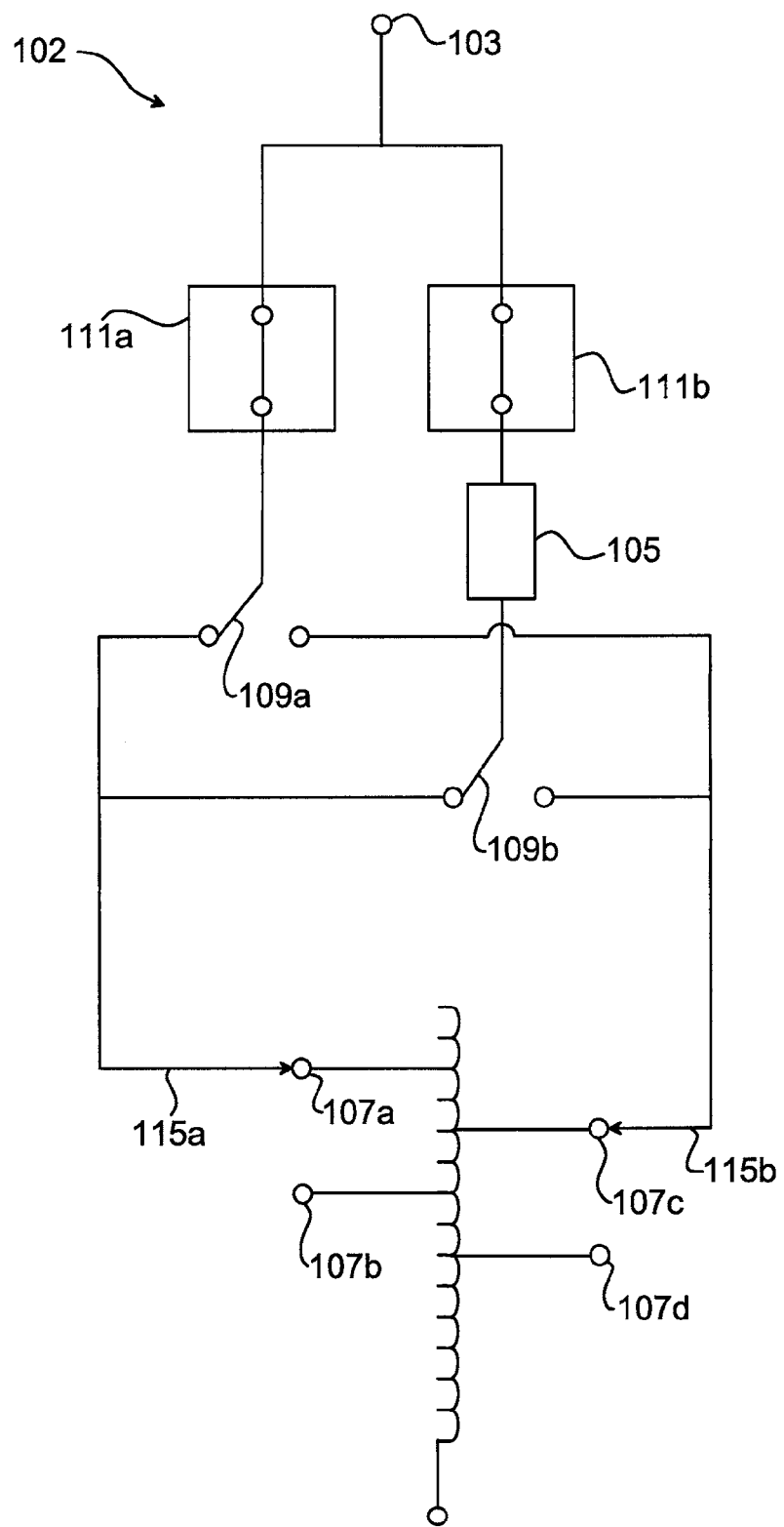
FIG. 1 is a schematic diagram illustrating an on-load tap changer 102 of a transformer.

FIG. 1 is a schematic diagram illustrating an on-load tap changer 102 of a transformer. The on-load tap changer (OLTC) 102 is used to change the tapping connection of the transformer winding while the transformer is energized. First the components of the OLTC 102 will be explained, followed by a use scenario. As shown in FIG. 1, a number of tapping connections 107a d are arranged to correspond to various voltages. Some of these tapping connections 107a b are arranged on one side and some of these tapping connections 107c d are arranged on another side. There are two tap selectors 115a b, one for each side. The left hand tap selector 115a is here connected to tapping connection 107a and the right hand tap selector 115b is here connected to tapping connection 107c.

A terminal 103 is used to connect a load. The terminal is connected to two vacuum switches 111a and 111b. The left vacuum switch 111a is connected to a first selector switch 109a. The right vacuum switch 111b is connected to an impedance 105. It is to be noted that the impedance 105 may be a pure resistor or a reactance impedance. The impedance 105 is further connected to a second selector switch 109b. As can be seen, both selector switches 109a-b can connect to either the left tap selector 115a or the right tap selector 115b.

In the situation shown in FIG. 1, both selector switches are connected to the left tap selector 115a. Since both vacuum switches 111a-b are closed, the terminal 103 is effectively connected to the left tap selector 115a which is connected to the tap connection 107a.

It will now be described one example of how the terminal 103 is supplied with a new voltage, without interrupting the supply of power. In other words, a load can be connected to terminal 103 during this whole procedure.

Initially, the tap selector 115b is connected to the tap connection corresponding to the desired new voltage. In this example, the desired tap connection is assumed to be tap connection 107c. If required, the tap selector 115b, which currently is not under load, performs any necessary switching to connect to the desired tap connection (which is not required here).

The left vacuum switch 111a then opens, whereby the first selector switch 109a can switch so it is connected to the right tap selector 115b. The first selector switch 109a is off-load during the switch, since the left vacuum switch 111a is open.

The left vacuum switch 111a then closes, connecting the terminal 103, through the first selector switch 109a to the right tap selector 115b. The impedance 105 prevents a short circuit between tap connections 107a and 107c.

The right vacuum switch 111b then opens, whereby the second selector switch 109b can switch so it is connected to the right tap selector 115b. The second selector switch 109b is off-load during the switch, since the left vacuum switch 111b is open.

Finally, the right vacuum switch 111b closes whereby the terminal 103 is connected to the right tap selector 115b and tap connection 107c. Due to the impedance 105, almost all current will flow through the left vacuum switch 111a and the first selector switch 109a.

It has thus been illustrated how terminal 103 is now connected to a new tapping connection while the transformer at all times was in a state allowing it to be energized. Since all breaking and closing of switches under load are performed using the vacuum switches 111a b, arcs in oil should normally not occur. Arcs do occur in the vacuum switches 111a b, but the switches are designed to withstand a large number of arcs.

This method works the same way in to connect to any of the tap connections 107a-b on the left hand side, with the only difference that the selector switches switch in the other direction.

It should be noted that the number of tapping connections shown in FIG. 1 are only selected for illustrative purposes; any number of suitable tapping connections can be provided.

Figure 2:
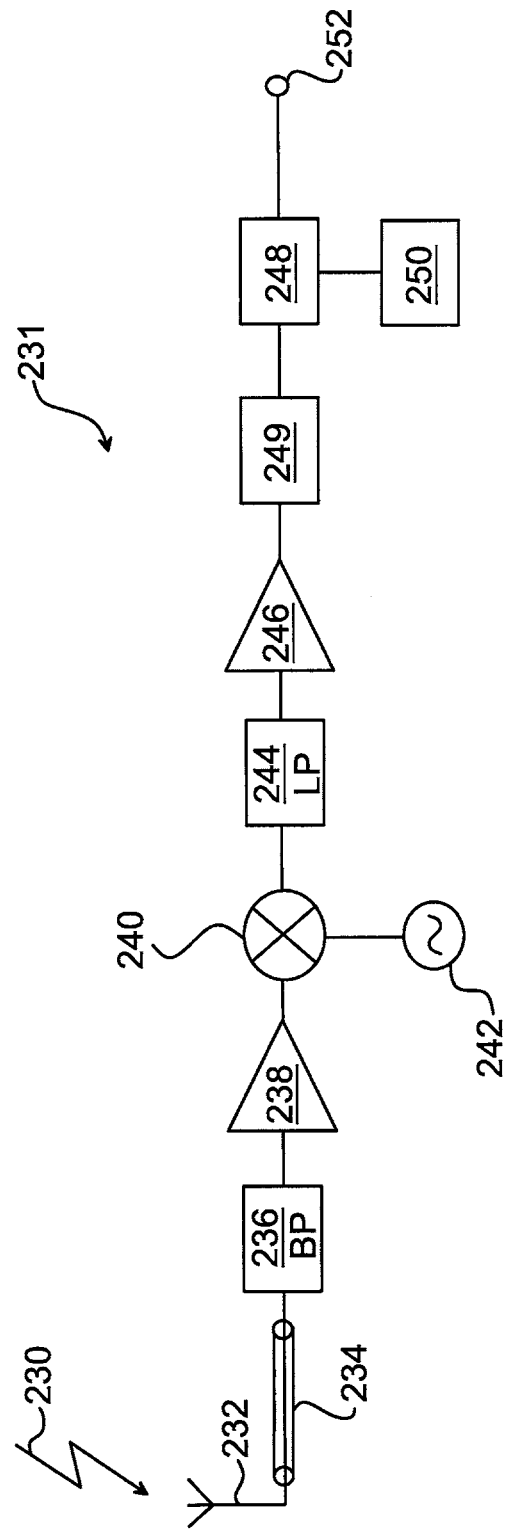
FIG. 2 is a schematic diagram of an arc detector 231, which can for example be used with the on-load tap changer of FIG. 1.

FIG. 2 is a schematic diagram of an arc detector 231, which can for example be used with on-load tap changer 102 of FIG. 1.

The arc detector 231 comprises an antenna 232 which detects an electromagnetic signal 230 from the arc. The electromagnetic signal 230 is for example radiation which is detectable even after if the arc is produced within a vacuum container and needs to pass through the walls of the vacuum container and any surrounding oil. Likewise, a radiation signal from an arc in oil is equally detectable. Consequently, the antenna 232 does not need to be in direct contact with the source of the arc. The signal from the antenna 232 is passed through a co-axial cable 234 to a band-pass filter 236. The band-pass filter emphasises a frequency band where the arc signal has substantial energy. After amplification by an amplifier 238, the signal is mixed in a mixer 240 with a signal from an oscillator 242 to decrease the signal frequency. A low-pass filter 244 reduces the band-width further. After another amplification by amplifier 246, an envelope detector 249 optionally creates an envelope of the signal provided from the amplifier 246. Finally, a discriminator 248 discriminates between a normal arc inside or an undesired arc outside any of the vacuum containers 111a-d (FIG. 1).

The discriminator 248 comprises a spectrum analyzer for discriminating between arcs from inside the vacuum container and arcs outside the vacuum container. The presence of an arc can for example be established by detecting a signal of at least a certain magnitude and/or a signal of at least a certain duration.

The discrimination 248 works by comparing a spectrum of the signal received from the antenna with a reference spectrum. The discriminator determines the arc to be inside the vacuum container if a deviation from the reference spectrum is less than a threshold deviation. Alternatively, the undesired arc can be detected if the reference spectrum represents an undesired arc. In other words, the signal does not need to be exactly like the reference signal to be determined a match. The deviation can for example be determined using a root mean square deviation, but any other suitable mechanism for determining deviation can be used. The reference spectrum can consist of one or more sub-spectrums, or partial reference spectrums, selected at frequencies where it has been found that the difference between a normal and undesired arc is relatively large. Each of these partial reference spectrums has a lower and an upper frequency, defining a band, and a reference signal level (or equivalent) between the lower and upper frequency.

The reference spectrum is stored in a memory 250, such as random access memory (RAM), read only memory (ROM), flash memory, magnetic memory, optical memory or any combination of these memory types. The comparing of the discriminator 248 is performed by using a controller, which can be any commercially available CPU (Central Processing Unit), DSP (Digital Signal Processor) or any other electronic programmable logic device.

Optionally, the discriminator can further include one or more of the previous components 236, 238, 240, 242, 244, 246, 249, for a simpler design.

The reference spectrum stored in the memory 250 can be a spectrum representing an arc inside the vacuum container, whereby a match would indicate that the signal represents an arc inside the vacuum container. Alternatively or additionally, the reference spectrum stored in the memory 250 can be a spectrum representing an arc outside the vacuum container, whereby a match would indicate that the signal represents an arc outside the vacuum container.

Optionally, instead of a pre-stored reference spectrum, a number of previous spectrums are stored in the memory 250 as an adaptive reference spectrum. When a new arc signal is analyzed, it can be compared as described above to the reference spectrum, but then the reference spectrum is the calculated average of the last number stored spectrums, i.e. the adaptive reference spectrum. The average is calculated per frequency or frequency band of the spectrum. An undesired arc will then stand out and deviate from the adaptive reference spectrum. If there are several undesired arcs with a similar spectrum, this will over time move the adaptive spectrum to such a degree that new undesired arcs are so close to the adaptive reference spectrum that they will not be considered undesired. At this point though, under the assumption that the number of spectrums for normal arcs is sufficiently large, several undesired arcs have already been detected, whereby an alarm or an alert can be generated.

Using adaptive reference spectrums allows for dynamic adaptive adjustment if there are long-term trends, where the spectrum of the normal arcs vary over time.

Optionally, the number of arcs in an arc train can be counted. The arc train is a number of arcs associated with one complete switch from one tap connection to another. If the number deviates from a pre-stored number, it can indicate the presence of an undesired arc.

Using the spectrum analyzer, the discriminator can in this way discriminate between a normal arc inside the vacuum container of the on-line tap changer and an undesired arc outside the vacuum container. The output signal from this analysis is provided on a terminal 252.

Aside from the embodiment of detecting and discriminating between normal and undesired arcs of on-load tap changers as described above, embodiments of the invention can be used for other applications. For example, embodiments of the invention can be used to detect and discriminate between normal and undesired arcing of electrical motors, circuit breakers or other electrical devices with both normal and undesired arcing.

Figure 3:
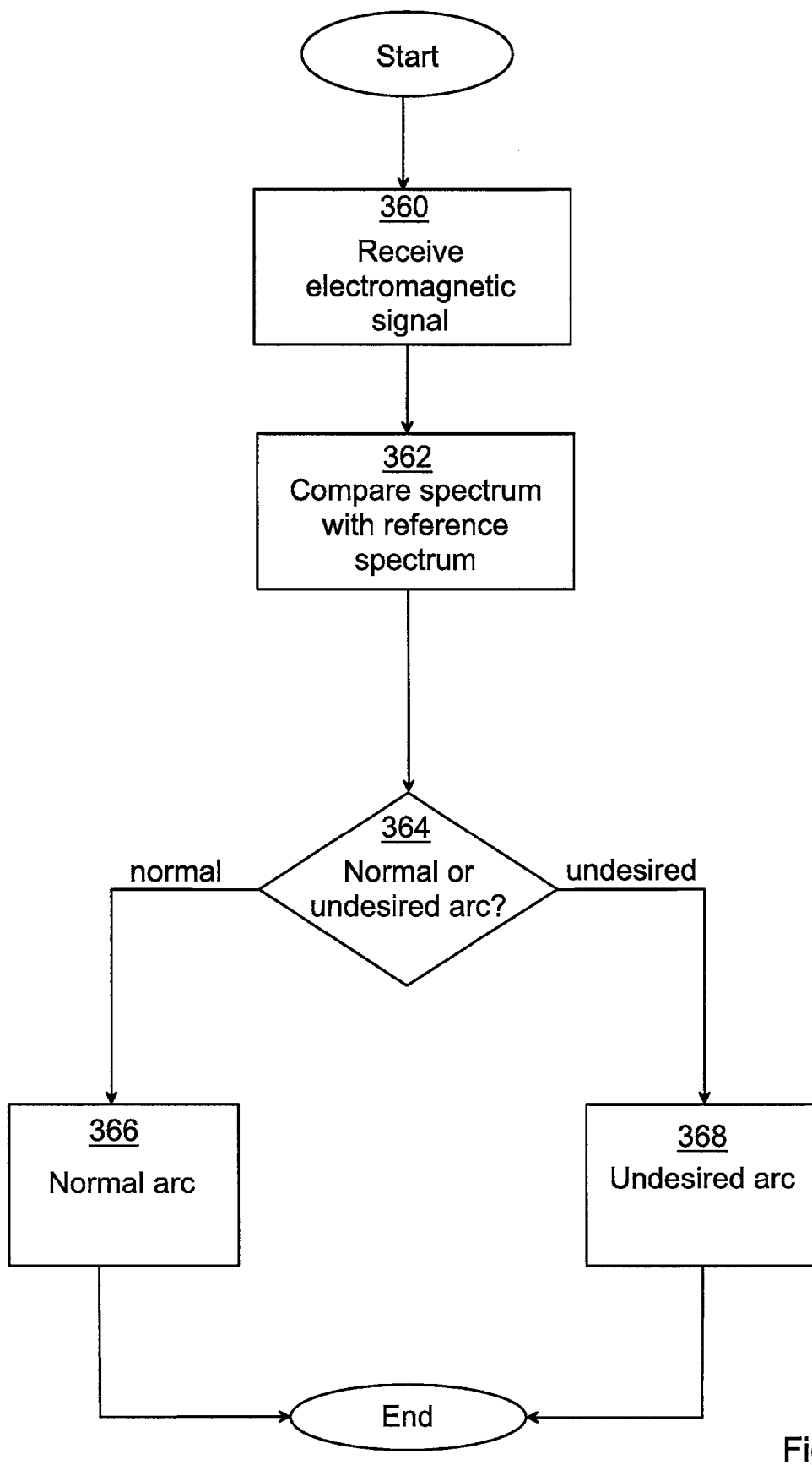
FIG. 3 is a flow chart illustrating a method of detecting undesired arcs.

FIG. 3 is a flow chart illustrating a method of detecting arcs of an on-load tap changer.

In an initial receive electromagnetic signal step 360, an electromagnetic signal representing an arc is received with an antenna.

In a compare spectrum with reference spectrum step 362, the arc signal is compared to a reference spectrum. The reference spectrum may be a continuous spectrum, or it can be one or more sub-spectrums, where each sub-spectrum represents part of the frequency of the signal. For example, there may be one or more certain characteristic frequency portions which are analyzed, whereas other frequencies are ignored and not compared. This enables a more robust and reliable discrimination between normal and undesired arcs. The reference spectrums are selected to be at frequencies where the difference between a normal and undesired arc is relatively large. The comparison between the received signal and the reference spectrum can for example be performed using a root mean square calculation.

In a conditional normal or undesired step 364, it is determined if the signal representing the arc represents a normal, acceptable arc, or if it represents an undesirable arc.

If the reference spectrum in the previous step 362 represents a normal arc, a deviation less a threshold deviation from this indicates that the signal represents a normal arc. Otherwise, the signal is determined to indicate an undesired arc.

On the contrary, if the reference spectrum in the previous step 362 represents an undesired arc, a deviation less a threshold deviation from this indicates that the signal represents an undesired arc. Otherwise, the signal is determined to indicate an undesired arc.

If the signal is determined to be a normal arc, the process continues to a normal arc step 366. Otherwise, the process continues to an undesired arc step 368.

In the normal arc step 366, a signal can be generated to indicate that the detected arc is a normal arc. Optionally, no signal is generated for a normal arc.

In the undesired arc step 368, a signal can be generated to indicate that the detected arc is an undesired arc. Other devices can react to this signal, e.g. by providing an alert to an operator or, in an emergency situation, disconnecting electrical power to the machine producing the undesired arc.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. An arc detector for detecting undesired arcs comprising:
    an antenna for receiving an electromagnetic signal representing an arc; and
    a discriminator for analyzing said signal from said antenna, said discriminator comprising a spectrum analyzer arranged to detect whether said signal represents a normal arc or an undesired arc,
    characterized in that
    said discriminator is arranged to detect whether said signal represents a normal arc or an undesired arc by comparing signal levels at frequencies of a spectrum of said signal corresponding to at least one partial reference spectrum, and determining said arc to be a normal arc if a deviation from said reference spectrum is less than a threshold deviation; and
    said arc is related to the operation of an on-load tap chancier of a power transformer, and said normal arc is an arc inside a vacuum container of said on-load tap changer and said undesired arc is an arc outside said vacuum container.

2. The arc detector according to claim 1, wherein said arc is related to the operation of an electrical apparatus.

3. The arc detector according to claim 1, wherein said reference spectrum is an adaptive reference spectrum, calculated as an average of a predetermined number of most recently analyzed signal spectrums.

4. The arc detector according to claim 1, further comprising a band-pass filter arranged to receive an input signal from said antenna and to provide an output signal to said discriminator.

5. The arc detector according to claim 4, further comprising:
- a mixer arranged to receive an input signal from said band-pass filter, said mixer further being connected to receive an input signal from an oscillator, and
- a low-pass filter, arranged to receive an input signal from said mixer and provide an output signal to said discriminator.

6. The arc detector according to claim 5, further comprising:
- an envelope detector arranged to receive an input signal from said low-pass filter and to provide an output signal to said discriminator.

7. A method for detecting undesired arcs, said method comprising steps of:
- receiving an electromagnetic signal representing an arc using an antenna and providing said signal to a discriminator; and
- discriminating, in said discriminator, between a normal arc and an undesired arc using said signal from said antenna, using a spectrum analyzer for discriminating between a normal arc and an undesired arc, characterized in that said discriminating comprises comparing signal levels at frequencies of a spectrum of said signal corresponding to at least one partial reference spectrum, determining said arc to be a normal arc if a deviation from said reference spectrum is less than a threshold deviation, and discriminating between a normal arc inside a vacuum container of an on-line tap changer for a power transformer and an undesired arc outside said vacuum container.

8. The method according to claim 7, wherein in said determining, said deviation is determined using a root mean square calculation.

* * * * *